US010075223B1

United States Patent
Pawar et al.

(10) Patent No.: US 10,075,223 B1
(45) Date of Patent: *Sep. 11, 2018

(54) SYSTEMS AND METHODS FOR PERFORMING BEAMFORMING DURING CARRIER AGGREGATION

(71) Applicant: Sprint Spectrum LP, Overland Park, KS (US)

(72) Inventors: Hemanth Pawar, Brambleton, VA (US); Pratik Kothari, Sterling, VA (US); Krishna Sitaram, Chantilly, VA (US); Chunmei Liu, Great Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/820,792

(22) Filed: Nov. 22, 2017

Related U.S. Application Data

(63) Continuation of application No. 14/792,872, filed on Jul. 7, 2015, now Pat. No. 9,859,967.

(51) Int. Cl.
*H04B 7/06* (2006.01)
*H04L 5/00* (2006.01)
*H04W 72/04* (2009.01)

(52) U.S. Cl.
CPC ......... *H04B 7/0617* (2013.01); *H04B 7/0634* (2013.01); *H04L 5/0048* (2013.01); *H04W 72/0453* (2013.01)

(58) Field of Classification Search
CPC ........................................... H04L 12/28
USPC .......................................................... 370/329
See application file for complete search history.

(56) References Cited

U.S. PATENT DOCUMENTS

| 9,155,044 | B2 | 10/2015 | Chung et al. |
| 9,258,092 | B2 | 2/2016 | Heo |
| 9,350,506 | B2 | 5/2016 | Damnjanovic et al. |
| 2011/0028148 | A1 | 2/2011 | Lee et al. |
| 2011/0199921 | A1 | 8/2011 | Damnjanovic |
| 2012/0257582 | A1 | 10/2012 | Damnjanovic et al. |
| 2013/0242911 | A1 | 9/2013 | Heo |
| 2014/0321346 | A1 | 10/2014 | Chung et al. |
| 2017/0325057 | A1* | 11/2017 | Zhang .................... H04W 4/02 |

* cited by examiner

*Primary Examiner* — Dang Ton

(57) ABSTRACT

Systems and methods are described for performing beamforming during carrier aggregation. It may be determined that conditions at an access node and a first wireless device meet a beamforming criteria, wherein the access node and the first wireless device communicate using carrier aggregation including a first frequency band comprising a primary carrier and a second frequency band comprising a component carrier. Data may be communicated between the access node and a second wireless device over the second frequency band, wherein the second wireless device is proximate to the first wireless device. Beamforming signal conditions may be determined for the first wireless device on the first frequency band and the second wireless device on the second frequency band. Beam formed signals may be transmitted to the first wireless device over the first frequency band using the beamforming signal conditions for the first wireless device and over the second frequency band using the beamforming signal conditions for the second wireless device.

20 Claims, 9 Drawing Sheets

SYSTEMS AND METHODS FOR PERFORMING BEAMFORMING DURING CARRIER AGGREGATION

This patent application is a continuation of U.S. patent application Ser. No. 14/792,872, filed on Jul. 7, 2015, entitled SYSTEMS AND METHODS FOR PERFORMING BEAMFORMING DURING CARRIER AGGREGATION.

TECHNICAL BACKGROUND

Telecommunication systems, such as cellular networks or other wireless networks, use various network links throughout the network to communicate. In certain circumstances, a network feature, such as carrier aggregation, may be leveraged to provide wireless services to a wireless device, but the conditions for the wireless device may change. For example, the wireless device may experience conditions that trigger beamforming at the access node. Accordingly, a system that effectively implements multiple network features, such as beamforming and carrier aggregation, may be able to provide a high quality service to users of the system.

OVERVIEW

Systems and methods are described for performing beamforming during carrier aggregation. It may be determined that conditions at one or more of an access node and a first wireless device meet a beamforming criteria, wherein the access node and the first wireless device communicate using carrier aggregation including a first frequency band comprising a primary carrier and a second frequency band comprising a component carrier. Data may be communicated between the access node and a second wireless device over the second frequency band, wherein the second wireless device is proximate to the first wireless device. Beamforming signal conditions may be determined for the first wireless device on the first frequency band and the second wireless device on the second frequency band. Beam formed signals may be transmitted to the first wireless device over the first frequency band using the beamforming signal conditions for the first wireless device and over the second frequency band using the beamforming signal conditions for the second wireless device.

DETAILED DESCRIPTION

Systems and methods are described for performing beamforming during carrier aggregation. For example, communication between a first wireless device and an access node may leverage carrier aggregation such that a first frequency band comprises a primary component carrier and a second frequency band comprises a secondary component carrier. In some instances, conditions for the first wireless device may trigger beamforming at the access node.

Prior system may have performed beamforming on the primary component carrier, however often the secondary component carrier would not leverage beamforming. In an embodiment, a second wireless device proximate to the first wireless device may be communicating with the access node over the second frequency band. Accordingly, signal information, such as beamforming signal information based on a received sounding reference signal, may be determined for the first wireless device on the first frequency band and for the second wireless device on the second frequency band. Beamforming may then be performed for the first wireless device over the first frequency band and over the second frequency band, where the beamforming signal information for the first wireless device is used to transmit a beam formed signal over the first frequency band and the beamforming signal information for the second wireless device is used to transmit a beam formed signal over the second frequency band. Accordingly, the determined signal information for the second wireless device may be leveraged in order to transmit a beam formed signal to the first wireless device over a component carrier of a carrier aggregation communication.

Figure 1:
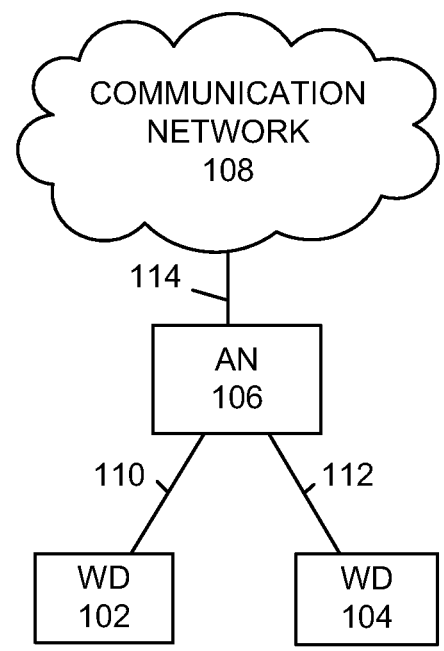
FIG. 1 illustrates an exemplary communication system to perform beamforming during carrier aggregation.

FIG. 1 illustrates an exemplary communication system 100 to perform beamforming during carrier aggregation comprising wireless devices 102 and 104, access node 106, communication network 108, and communication links 110, 112, and 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented.

Access node 106 is a network node capable of providing wireless communications to wireless devices 102 and 104, and can be, for example, a base transceiver station, a radio base station, and an eNodeB device. Access node 106 may communicate with communication network 108 over communication link 114. Although only access node 106 is illustrated in FIG. 1, wireless devices 102 and 104 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, and 114, can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2A:
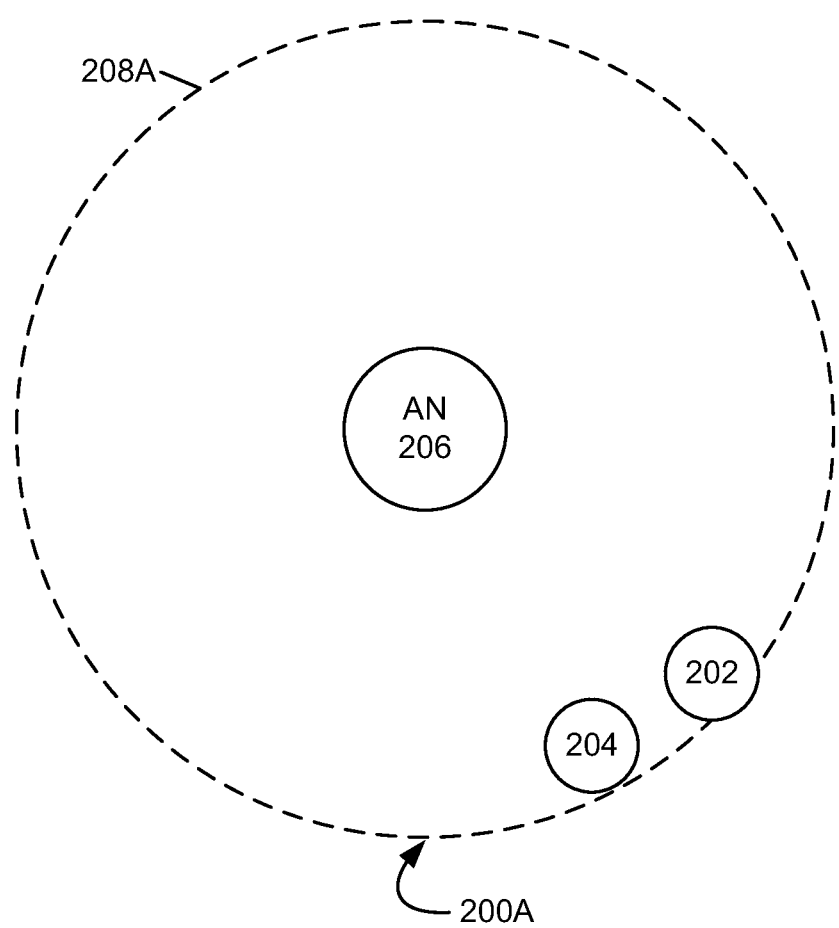
FIGS. 2A-2C illustrate exemplary systems to perform beamforming during carrier aggregation.
Figure 2B:
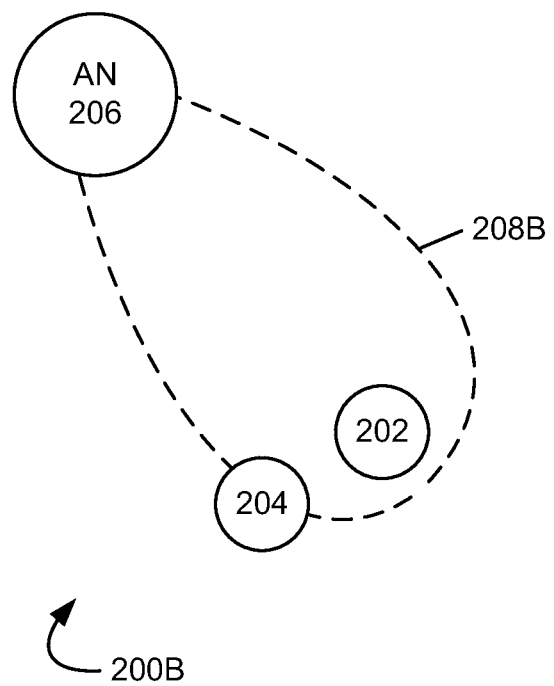
Figure 2C:
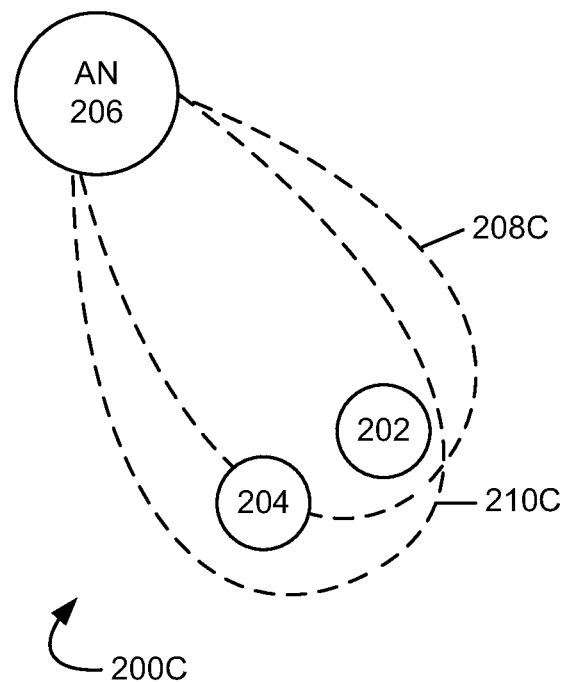

FIGS. 2A-2C illustrate exemplary communication systems 200A, 200B, and 200C for performing beamforming during carrier aggregation. Systems 200A, 200B and 200C comprise wireless devices 202 and 204, access node 206, signal area 208A, and beam formed signals 208B, 208C, and 210C. Wireless devices 202 and 204 may comprise devices similar to wireless device 102. Access node 206 may comprise an access node similar to access node 106.

In operation, access node 206 may establish communication with wireless devices 202 and 204 such that access node 206 provides the wireless devices access to a communication network (e.g., communication network 108). Signal area 208A may comprise an area around access node 206 where a wireless device may detect wireless signals transmitted from the access node at a signal level above a threshold. For example, signal area 208A may comprise a coverage area for access node 206, such that wireless devices that fall within the signal area may be provided wireless services by the access node.

In an embodiment, systems 200A, 200B, and 200C may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, systems 200A, 200B, and 200C may leverage beamforming to enhance the wireless services provided to wireless device 202. For example, wireless device 202 may be located at the edge of signal area 208A. Accordingly, the wireless device may comprise a low channel quality (e.g., a channel quality indicator (CQI) below a threshold). The low channel quality may be based on a high interference level for the signals received by wireless device 202, or other suitable factors. In an embodiment, access node 206 may perform beamforming such that a signal transmitted to wireless device 202 is adjusted based on the location of the wireless device. For example, an adjusted beam 208B may be transmitted from access node 206 such that wireless device 202 may experience greater channel quality when communicating with access node 206. In an embodiment, the adjusted beam 208B may comprise of signals transmitted over a frequency band assigned to wireless device 202 (e.g., assigned as the frequency band that access node 204 uses to communicate with wireless device 202).

In an embodiment, beamforming may be accomplished using a plurality of antennas at access node 206 that implement, for example, a multiple input multiple output (MIMO) protocol. The signals from each of the plurality of antennas may be controlled such that the net signal from the access node may be transmitted towards wireless device 202 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 202 and destructive interference in other directions (e.g., away from wireless device 202). System 200B shows access node 206 adjusting a beam emitted by the access node towards wireless device 202. For example, adjusted signal beam 208B may be narrowed towards the location of wireless device 202.

In an embodiment, carrier aggregation may also be implemented by the systems 200A, 200B, and 200C. For example, access node 206 may communicate with wireless device 202 using carrier aggregation such that the data rate (or throughput) for the communication is greater than the data rate for single carrier communication. In an embodiment, access node 206 may communicate with wireless device 202 using a primary carrier (e.g., a first frequency band) and one or more secondary carriers (e.g., one or more secondary frequency bands). For example, a primary channel (e.g., 5 or 10 Mhz channel) and one or more secondary channels may be allocated for communication between access node 206 and wireless device 202, where each channel may comprise a component carrier for the communication. When using carrier aggregation, the available spectrum for communication, and thus the data rate or throughput, may increase directly with the number of secondary component carriers. The communication may leverage one or more of intra-band carrier aggregation with contiguous component carriers, intra-band carrier aggregation with non-contiguous component carriers, or inter-band carrier aggregation.

In an embodiment, access node 206 may communicate with wireless device 202 using carrier aggregation. In some examples, conditions for beamforming may be met for access node 206 and/or wireless device 202. For example, wireless device 202 may move to an edge of signal area 208A. In this example, wireless device 202 may benefit from both a beam formed signal and carrier aggregation. Accordingly, a system that effectively performs beamforming during carrier aggregation may provide enhanced service to wireless devices.

Figure 3:
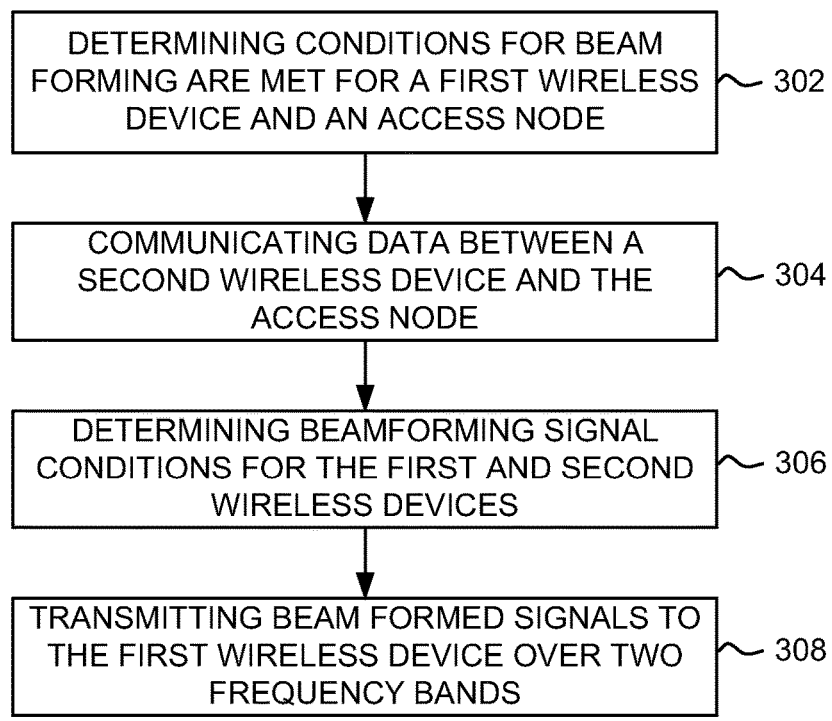
FIG. 3 illustrates an exemplary method of performing beamforming during carrier aggregation.

FIG. 3 illustrates an exemplary method for performing beamforming during carrier aggregation. The method will be discussed with reference to the exemplary communication systems 200A, 200B, and 200C illustrated in FIGS. 2A, 2B, and 2C, however, the method can be implemented with any suitable communication system.

Referring to FIG. 3, at step 302, it may be determined that conditions at one or more of an access node and a first wireless device meet a beamforming criteria, wherein the access node and the first wireless device communicate using carrier aggregation including a first frequency band comprising a primary carrier and a second frequency band comprising a component carrier. For example, it may be determined that conditions at wireless device 202 and/or access node 206 meet a beamforming criteria.

In an embodiment, wireless device 202 and access node 206 may also communicate using carrier aggregation. For example, a primary component carrier may comprise a first frequency band and a secondary component carrier may comprise a second frequency band for the carrier aggregation.

At step 304, data may be communicated between the access node and a second wireless device over the second frequency band, wherein the second wireless device is proximate to the first wireless device. For example, data may be communicated between wireless device 204 and access node 206 over the second frequency band. Wireless device 204 may also be determined to be proximate to wireless device 202.

At step 306, beamforming signal conditions may be determined for the first wireless device on the first frequency band and the second wireless device on the second frequency band. For example, a configuration signal (e.g., sounding reference signal) may be received at access node 206 from each of wireless devices 202 and 204. Based on the received signals, beamforming signal conditions may be determined for wireless device 202 on the first frequency band (e.g. corresponding to the primary component carrier) and for wireless device 204 on the second frequency band (e.g., corresponding to the frequency band used form communication). In an embodiment, the beamforming signal conditions may comprise weights for antennas such that a beam formed signal may be transmitted to the respective wireless device over the respective frequency band.

At step 308, beam formed signals may be transmitted to the first wireless device over the first frequency band using the beamforming signal conditions for the first wireless device and over the second frequency band using the beamforming signal conditions for the second wireless device. For example, beam formed signals 208C and 210C may be transmitted to wireless device 202 from access node 206, wherein beam formed signal 208C may be transmitted based on the beamforming signal conditions determined for wireless device 202 over the first frequency band and beam formed signal 210C may be transmitted based on the beamforming signal conditions determined for wireless device 204 over the second frequency band. In an embodiment, the beamforming signal conditions for wireless device 204 on the second frequency band may be used to transmit a beam formed signal to wireless device 202 over the second frequency band as a part of a carrier aggregation communication.

Figure 4:
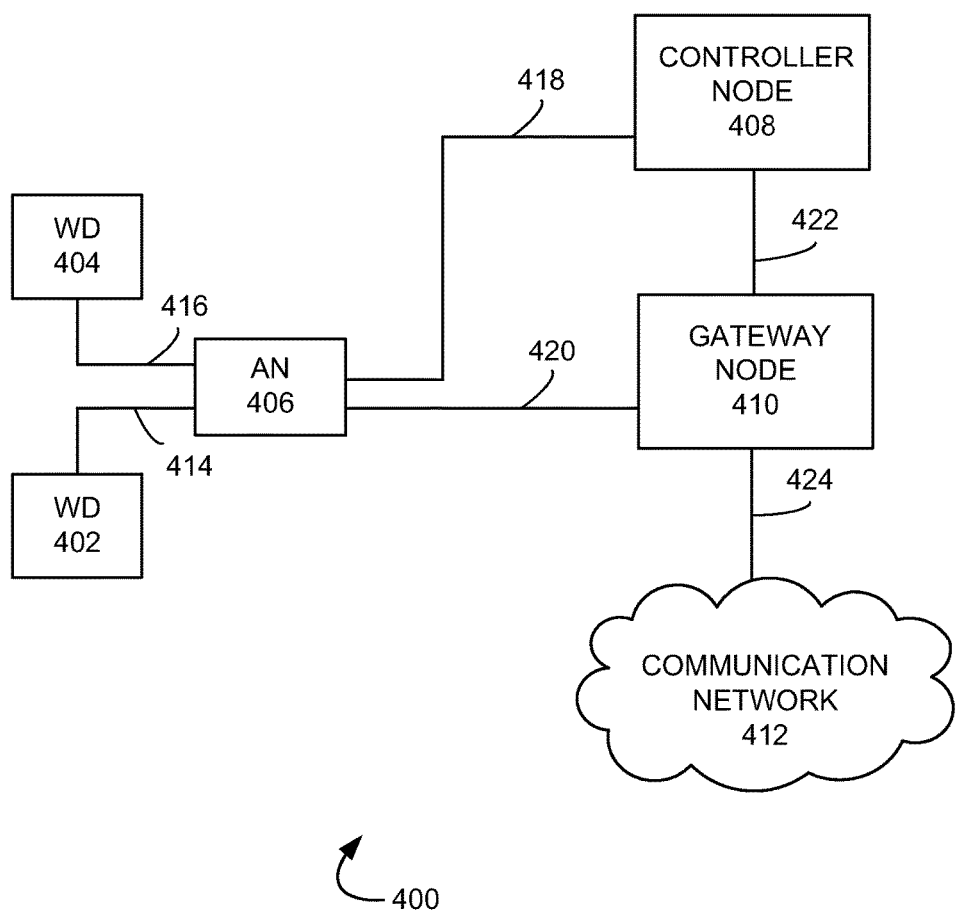
FIG. 4 illustrates another exemplary system to perform beamforming during carrier aggregation.

FIG. 4 illustrates another exemplary communication system 400 to perform beamforming during carrier aggregation. Communication system 400 may comprise wireless devices 402 and 404, access node 406, controller node 408, gateway node 410, communication network 412, and communication links 414, 416, 418, 420, 422, and 424. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any device configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 is a network node capable of providing wireless communications to wireless devices 402 and 404, and can be, for example, a base transceiver station, a radio base station, or an eNodeB device. In an embodiment, access node 406 can comprise a serving access node for wireless device 402 and 404. Access node 406 may communicate with controller node 408 over communication link 418, and with gateway node 410 over communication link 420.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 414 can provide instructions to access node 406 related to channel selection in communications with wireless devices 402 and 404. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, and 424 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, and one or more modules of access node 406 may perform all or parts of the methods of FIGS. 3 and 5.

In operation, access node 406 may establish communication with wireless devices 402 and 404 such that access node 406 provides the wireless device access to a communication network (e.g., communication network 412). Access node 406 may also comprise a signal area (e.g., similar to signal area 208A of FIG. 2). In an embodiment, system 400 may use a plurality of carriers in order to provide wireless communication services. A plurality of carriers that comprise bandwidth for wireless communications (e.g., 1.25 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, system 400 may leverage beamforming to enhance the wireless services provided to wireless device 402. For example, wireless device 402 may be located at the edge of a signal area for access node 406. Accordingly, the wireless device may comprise a low channel quality (e.g., a channel quality indicator (CQI) below a threshold). In an embodiment, access node 406 may perform beamforming such that a signal transmitted to wireless device 402 is adjusted based on the location of the wireless device. For example, an adjusted beam may be transmitted from access node 406 such that wireless device 402 may experience greater channel quality when communicating with access node 406. In an embodiment, the adjusted beam may be similar to adjusted beam 208B of FIG. 2.

In an embodiment, beamforming may be accomplished using a plurality of antennas at access node 406 that implement, for example, a multiple input multiple output (MIMO) protocol. The signals from each of the plurality of antennas may be controlled such that the net signal from the access node may be transmitted towards wireless device 402 as a beam formed signal. In an embodiment, the beam may be formed by weighing the magnitude and/or phase of the signals transmitted by each individual antenna. For example, the signals may be weighed such that the emitted waveform from the antennas experiences constructive interference in the direction of wireless device 402 and destructive interference in other directions (e.g., away from wireless device 402).

In an embodiment, carrier aggregation may also be implemented by the system 400. For example, access node 406 may communicate with wireless device 402 using carrier aggregation such that the data rate (or throughput) for the communication is greater than the data rate for single carrier communication. In an embodiment, access node 406 may communicate with wireless device 402 using a primary carrier (e.g., a first frequency band) and one or more secondary carriers (e.g., one or more secondary frequency bands).

In an embodiment, access node 406 may communicate with wireless device 402 using carrier aggregation. In some examples, conditions for beamforming may be met for access node 406 and/or wireless device 402. For example, wireless device 402 may move to an edge of the signal area for access node 406. In this example, wireless device 402 may benefit from both a beam formed signal and carrier aggregation. Accordingly, a system that effectively performs beamforming during carrier aggregation may provide enhance service to wireless devices.

Figure 5:
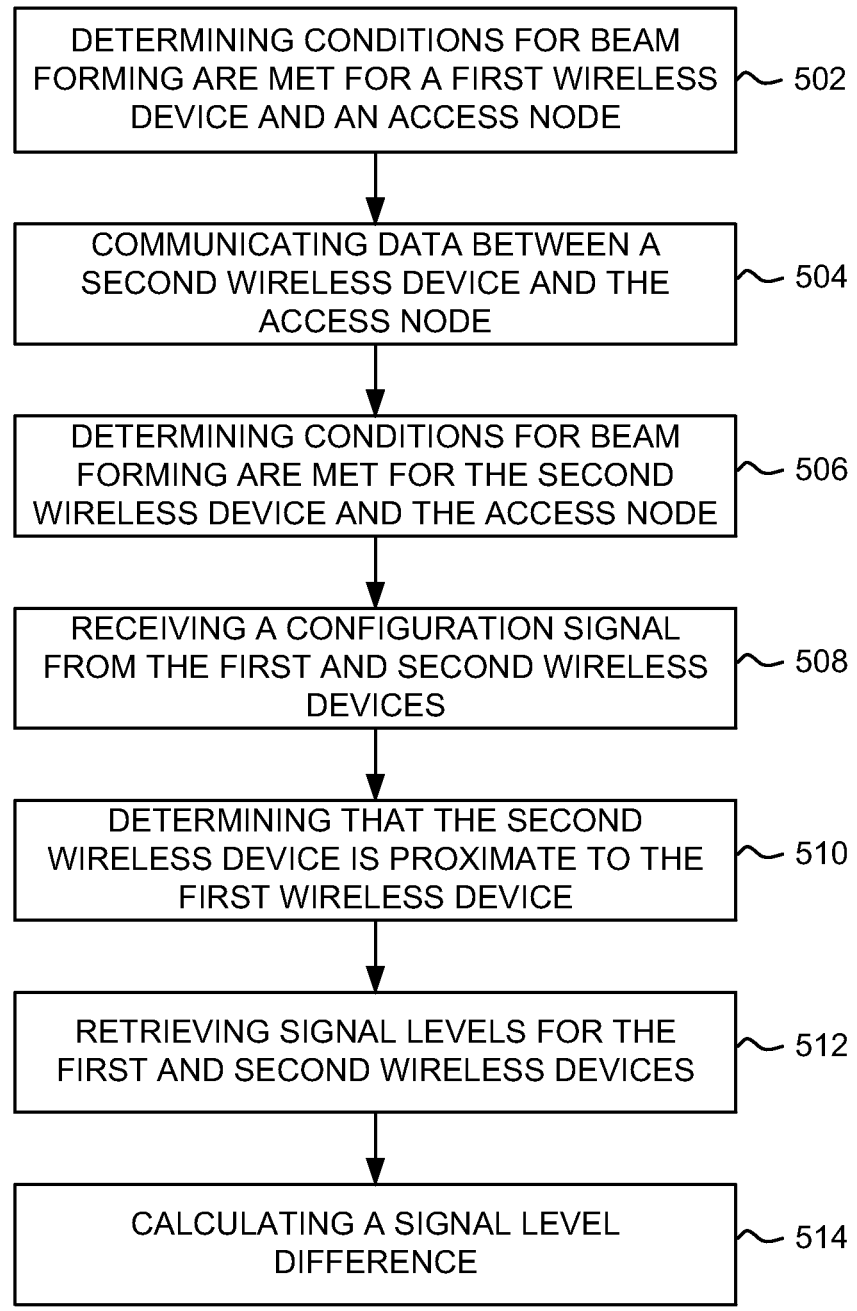
FIG. 5 illustrates another exemplary method of performing beamforming during carrier aggregation.
Figure 5:
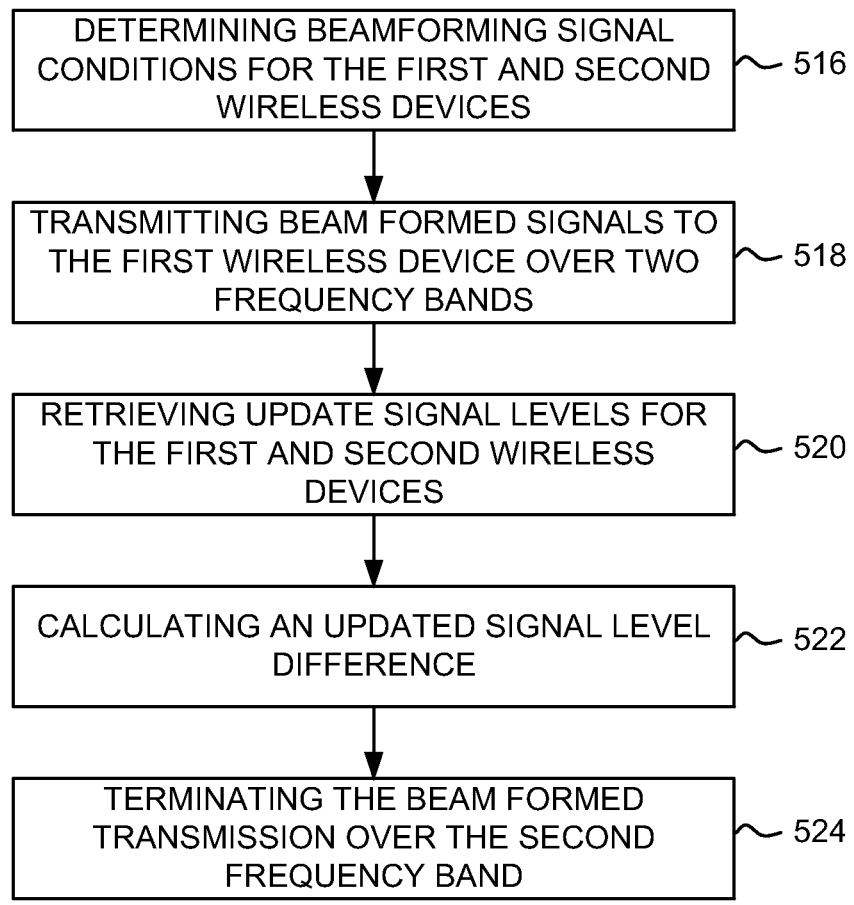

FIG. 5 illustrates an exemplary method for performing beamforming during carrier aggregation. The method will be discussed with reference to the exemplary communication system 400 illustrated in FIG. 4, however, the method can be implemented with any suitable communication system.

Referring to FIG. 5, at step 502, it may be determined that conditions at one or more of an access node and a first wireless device meet a beamforming criteria, wherein the access node and the first wireless device communicate using carrier aggregation including a first frequency band comprising a primary carrier and a second frequency band comprising a component carrier. For example, it may be determined that conditions at wireless device 402 and/or access node 406 meet a beamforming criteria.

In an embodiment, the beamforming criteria may comprise one or more of a threshold signal level for a signal received at wireless device 402 from access node 406 (e.g., SINR, RSRP, and the like), a threshold load on access node 406 (e.g., number of RRC connections, processor load, queue size for resource block transmissions, and the like), a channel quality indictor (CQI) for wireless device 402, a criteria based on one or more applications requirements for wireless device 402 (e.g., QCI, minimum bit rate, guaranteed or non-guaranteed bit rate, maximum error rate, and the like), and any other suitable criteria. For example, a signal level (e.g., RSRP) for wireless device 402, application requirements for wireless device 402, and a load on access node 406 may meet the beamforming criteria. In an embodiment, wireless device 402 may move to the edge of a signal area for access node 406, and the movement may cause the beamforming criteria to be met.

In an embodiment, wireless device 402 and access node 406 may also communicate using carrier aggregation. For example, a primary component carrier may comprise a first frequency band and a secondary component carrier may comprise a second frequency band for the carrier aggregation. In an embodiment, the carrier aggregation may comprise a plurality of secondary component carriers.

At step 504, data may be communicated between the access node and a second wireless device over the second frequency band. For example, data may be communicated between wireless device 404 and access node 406 over the second frequency band.

At step 506, it may be determined that conditions at one or more of the access node and the second wireless device meet the beamforming criteria. For example, it may be determined that conditions at wireless device 404 and/or access node 406 meet a beamforming criteria.

In an embodiment, the beamforming criteria may comprise one or more of a threshold signal level for a signal received at wireless device 404 from access node 406 (e.g., SINR, RSRP, and the like), a threshold load on access node 406 (e.g., number of RRC connections, processor load, queue size for resource block transmissions, and the like), a channel quality indictor (CQI) for wireless device 404, a criteria based on one or more applications requirements for wireless device 404 (e.g., QCI, minimum bit rate, guaranteed or non-guaranteed bit rate, maximum error rate, and the like), and any other suitable criteria. For example, a signal level (e.g., RSRP) for wireless device 404, application requirements for wireless device 404, and a load on access node 406 may meet the beamforming criteria. In an embodiment, wireless device 404 may move to the edge of a signal area for access node 406, and the movement may cause the beamforming criteria to be met.

At step 508, beamforming configuration signals may be received at the access node from the first wireless device and the second wireless device. For example, wireless device 402 may transmit a beamforming configuration signal to access node 406 over the first frequency band and wireless device 404 may transmit a beamforming configuration signal to access node 406 over the second frequency band.

In an embodiment, the beamforming configuration signals from wireless devices 402 and 404 may each be received at a particular Direction of Arrival (DOA). For example, access node 406 may determine a DOA for each of the beamforming configuration signals based on a reception of the signal at the antennas of the access node (e.g., reception signal levels, such as SINR, at each of a plurality of antennas of access node 406). In an embodiment, the beamforming configuration signal may comprise a sounding reference signal (SRS) transmitted from each of the wireless devices.

At step 510, it may be determined that the second wireless device is proximate to the first wireless device based on the received beamforming configuration signals. For example, the DOA of the beamforming configuration signal received from wireless device 402 may be compared to the DOA of the beamforming configuration signal received from wireless device 404. The comparison may comprise calculating a difference between the DOA's for each beamforming configuration signal. In an embodiment, wireless device 404 may be determined to be proximate to wireless device 402 when the calculated difference between the DOA's meets a criteria (e.g., is less than a threshold difference).

At step 512, signal levels may be retrieved for the first wireless device and the second wireless device. For examples, a signal level for a signal received at wireless device 402 from access node 406 may be retrieved and a signal level for a signal received at wireless device 404 from access node 406 may be retrieved. In an embodiment, the retrieved signal levels may comprise a channel quality indictor (CQI), reference signal received power (RSRP), signal to noise plus interference ratio (SINR) for a received signal, and any other suitable signal level.

At step 514, a signal level difference may be calculated for the retrieved signals levels. For example, a signal level difference may be calculated between the retrieved signal level for wireless device 402 and the retrieved signal level for wireless device 404. In an embodiment, the calculated signal level difference may be compared to a signal level criteria (e.g., threshold). For example, it may be determined that beamforming signal conditions for wireless device 404 over the second frequency band may be leveraged for a transmission to wireless device 402 over the second frequency band (e.g., the secondary component carrier for wireless device 402) when the calculated signal level difference meets a criteria (e.g., is less than a threshold).

At step 516, beamforming signal conditions may be determined for the first wireless device on the first frequency band and the second wireless device on the second frequency band. For example, a configuration signal (e.g., sound reference signal) may be received at access node 406 from each of wireless devices 402 and 404. Based on the received signals, beamforming signal conditions may be determined for wireless device 402 on the first frequency band (e.g. corresponding to the primary component carrier) and for wireless device 404 on the second frequency band (e.g., corresponding to the frequency band used form communication with access node 406).

In an embodiment, the beamforming signal conditions may comprise weights for antennas such that a beam formed signal may be transmitted to the respective wireless device over the respective frequency band. For example, based on a sounding reference signal received from wireless device 402 over the first frequency band, weights for the plurality of antennas at access node 406 may be determined such that a beam formed signal may be transmitted towards wireless device 402 over the first frequency band. Similarly, based on a sounding reference signal received from wireless device 404 over the second frequency band, weights for the plurality of antennas at access node 406 may be determined such that a beam formed signal may be transmitted towards wireless device 404 over the second frequency band.

At step 518, beam formed signals may be transmitted to the first wireless device over the first frequency band using the beamforming signal conditions for the first wireless device and over the second frequency band using the beamforming signal conditions for the second wireless device. For example, beam formed signals similar to signals 208C and 210C of FIG. 2 may be transmitted to wireless device 402 from access node 406. In an embodiment, the beam formed signal over the first frequency band may be transmitted based on the beamforming signal conditions determined for wireless device 402 (e.g., antenna weights determined based on the sounding reference signal received from wireless device 402) and the beam formed signal over the second frequency band may be transmitted based on the beamforming signal conditions determined for wireless device 404 (e.g., antenna weights determined based on the sounding reference signal received from wireless device 404).

In an embodiment, the determined beamforming signal conditions for wireless device 404 on the second frequency band may be used to transmit a beam formed signal to wireless device 402 over the second frequency band when wireless device 404 is determined to be proximate to wireless device 402 and the calculated signal level difference (e.g., difference is CQI's for wireless devices 402 and 404) meets a signal level criteria (e.g., threshold). The determination that wireless device 404 is proximate to wireless device 402 and the determination that the calculated signal level difference meets a criteria may indicate that a beam formed signal based on the beamforming signal conditions for wireless device 404 may be used to transmit a beam formed signal to wireless device 402 over the second frequency band.

In an embodiment, the determined beamforming signal conditions for wireless device 402 on the first frequency band may be used to transmit a beam formed signal to wireless device 404 over the first frequency band when wireless device 404 is determined to be proximate to wireless device 402 and the calculated signal level difference (e.g., difference is CQI's for wireless devices 402 and 404) meets a signal level criteria (e.g., threshold). The determination that wireless device 402 is proximate to wireless device 404 and the determination that the calculated signal level difference meets a criteria may indicate that a beam formed signal based on the beamforming signal conditions for wireless device 402 may be used to transmit a beam formed signal to wireless device 404 over the first frequency band.

At step 520, updated signal levels may be retrieved for the first wireless device and the second wireless device. For examples, an updated signal level for a signal received at wireless device 402 from access node 406 may be retrieved and an updated signal level for a signal received at wireless device 404 from access node 406 may be retrieved. In an embodiment, the updated signal levels may be retrieved after a beam formed signal has been transmitted from access node 406 to wireless device 402 over the second frequency band based on the beamforming conditions for wireless device 404.

At step 522, an updated signal level difference may be calculated for the updated signals levels. For example, an updated signal level difference may be calculated between the updated signal level for wireless device 402 and the updated signal level for wireless device 404. In an embodiment, the updated signal level difference may be compared to a signal level criteria (e.g., threshold). For example, it may be determined that the beam formed signal transmitted to wireless device 402 over the second frequency band based on the beamforming signal conditions for wireless device 404 may be terminated when the updated signal level difference fails to meet a criteria (e.g., is greater than a threshold).

At step 524, the beam formed transmission to the first wireless device over the second frequency band may be terminated when the updated signal level difference fails to meet a criteria. For example, the beam formed signal transmitted to wireless device 402 over the second frequency band based on the beamforming signal conditions for wireless device 404 may be terminated when the updated signal level difference fails to meet a criteria (e.g., is greater than a threshold). In an embodiment, the updated signal level difference failing to meet the criteria may indicate that the beamforming signal conditions for wireless device 404 over the second frequency band my no longer be used to transmit a beam formed signal to wireless device 402 over the second frequency band.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
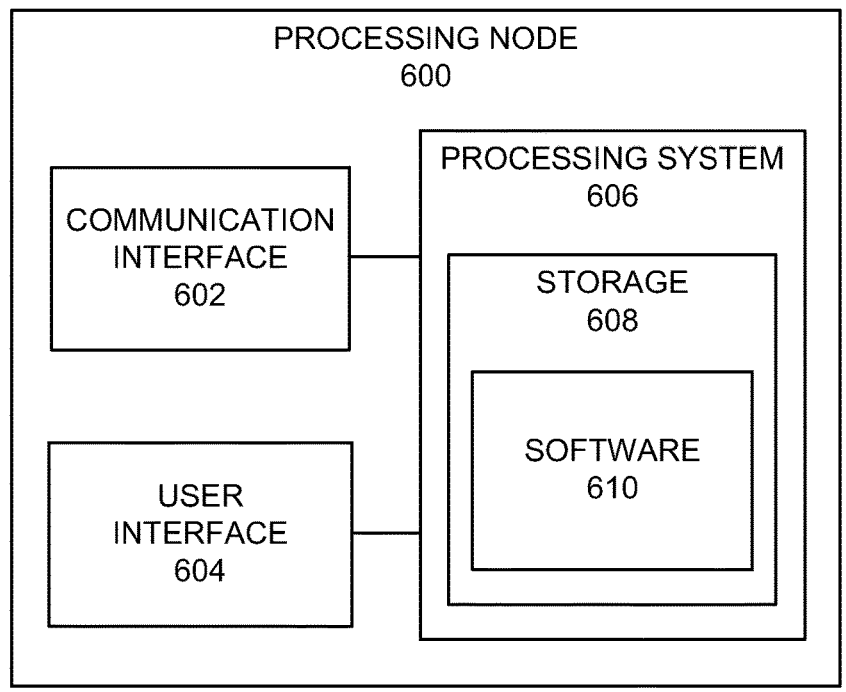
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 106 or 406 and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for performing beamforming during carrier aggregation, the method comprising:
   communicating data between an access node and a first wireless device using carrier aggregation including a first frequency band comprising a primary carrier and a second frequency band comprising a component carrier;
   determining that a second wireless device from one or more wireless devices is proximate to the first wireless device and that the second wireless device communicates with the access node using the second frequency band;
   determining beam-forming signal conditions for the first wireless device on the first frequency band and the second wireless device on the second frequency band; and
   transmitting beam formed signals to the first wireless device over the first frequency band using the signal conditions for the first wireless device and over the second frequency band using the signal conditions for the second wireless device.

2. The method of claim 1, wherein the transmitted beam formed signals over the first and second frequency bands are part of a carrier aggregation communication between the access node and the first wireless device.

3. The method of claim 1, wherein transmitting beam formed signals to the first wireless device further comprises:
   calculating antenna weights for a beam formed transmission to the first wireless device over the first frequency band using the signal conditions for the first wireless device and antenna weights for a beam formed transmission to the first wireless device over the second frequency band using the signal conditions for the second wireless device.

4. The method of claim 1, further comprising:
   determining that conditions at one or more of the access node and the second wireless device, meet a beam-forming criteria, wherein the access node and the second wireless device communicate over the second frequency band;
   receiving configuration signals from the first wireless device and the second wireless device, wherein the received configuration signals are used to determine transmission antenna weights when transmitting beam formed signals; and
   determining that the second wireless device is proximate to the first wireless device based on the received configuration signals.

5. The method of claim 4, wherein
   the received configuration signals comprise sounding reference signals, and
   the second wireless device is determined to be proximate to the first wireless device based on a direction of arrival for the received sounding reference signals.

6. The method of claim 5, further comprising:
   calculating a difference between the direction of arrival for the sounding reference signals from the first wireless device and the direction of arrival for the sounding reference signals from the second wireless device; and
   determining that the second wireless device is proximate to the first wireless device when the calculated direction of arrival difference meets a criteria.

7. The method of claim 5, wherein the beam-forming signal conditions are determined for the first wireless device on the first frequency band and the second wireless device on the second frequency band based on the received sounding reference signals.

8. The method of claim 1, further comprising:
   retrieving a signal level for the first wireless device corresponding to the first frequency band and a signal level for the second wireless device;
   calculating a signal level difference between the signal level for the first wireless device and the signal level for the second wireless device; and
   transmitting the beam formed signals to the first wireless device over the second frequency band using the signal conditions for the second wireless device when the calculated signal level difference meets a criteria.

9. The method of claim 8, further comprising:
   retrieving an updated signal level for the first wireless device and an updated signal level for the second wireless device;
   calculating an updated signal level difference between the updated signal level for the first wireless device and the updated signal level for the second wireless device; and
   terminating the transmission of the beam formed signals to the first wireless device over the second frequency band using the signal conditions for the second wireless device when the updated signal level difference fails to meet the criteria.

10. A system for performing beam-forming during carrier aggregation, the system comprising:
    an access node with a processing node configured to:
    communicate data between the access node and a first wireless device using carrier aggregation including a first frequency band comprising a primary carrier and a second frequency band comprising a component carrier;
    determining that a second wireless device from one or more wireless devices is proximate to the first wireless device and that the second wireless device communicates with the access node using the second frequency band;
    determine beam-forming signal conditions for the first wireless device on the first frequency band and the second wireless device on the second frequency band; and
    transmit beam formed signals to the first wireless device over the first frequency band using the signal conditions for the first wireless device and over the second frequency band using the signal conditions for the second wireless device.

11. The system of claim 10, wherein the transmitted beam formed signals over the first and second frequency bands are part of a carrier aggregation communication between the access node and the first wireless device.

12. The system of claim 10, wherein transmitting beam formed signals to the first wireless device further comprises:
calculating antenna weights for a beam formed transmission to the first wireless device over the first frequency band using the signal conditions for the first wireless device and antenna weights for a beam formed transmission to the first wireless device over the second frequency band using the signals conditions for the second wireless device.

13. The system of claim 10, wherein the processing node is further configured to:
determine that conditions at one or more of the access node and the second wireless device, meet a beam-forming criteria, wherein the access node and the second wireless device communicate over the second frequency band;
receive configuration signals from the first wireless device and the second wireless device, wherein the received configuration signals are used to determine transmission antenna weights when transmitting beam formed signals; and
determine that the second wireless device is proximate to the first wireless device based on the received configuration signals.

14. The system of claim 13, wherein
the received configuration signals comprise sounding reference signals, and
the second wireless device is determined to be proximate to the first wireless device based on a direction of arrival for the received sounding reference signals.

15. The system of claim 14, wherein the processing node is further configured to:
calculate a difference between the direction of arrival for the sounding reference signals from the first wireless device and the direction of arrival for the sounding reference signals from the second wireless device; and
determine that the second wireless device is proximate to the first wireless device when the calculated direction of arrival difference meets a criteria.

16. The system of claim 14, wherein the beam-forming signal conditions are determined for the first wireless device on the first frequency band and the second wireless device on the second frequency band based on the received sounding reference signals.

17. The system of claim 10, wherein the processing node is further configured to:
retrieve a signal level for the first wireless device corresponding to the first frequency band and a signal level for the second wireless device;
calculate a signal level difference between the signal level for the first wireless device and the signal level for the second wireless device; and
transmit the beam formed signals to the first wireless device over the second frequency band using the signal conditions for the second wireless device when the calculated signal level difference meets a criteria.

18. The system of claim 17, wherein the processing node is further configured to:
retrieve an updated signal level for the first wireless device and an updated signal level for the second wireless device;
calculate an updated signal level difference between the updated signal level for the first wireless device and the updated signal level for the second wireless device; and
terminate the transmission of the beam formed signals to the first wireless device over the second frequency band using the signal conditions for the second wireless device when the updated signal level difference fails to meet the criteria.

19. A method for performing beamforming during carrier aggregation, the method comprising:
performing carrier aggregation between an access node and a first wireless device using a primary component carrier and one or more secondary component carriers;
determining that a second wireless device from one or more wireless devices is proximate to the first wireless device and that the second wireless device communicates with the access node using a second frequency band that comprises one of the secondary component carriers;
determining a first wireless device beamforming signal condition for the one of the secondary component carriers using a second wireless device beamforming condition of the second frequency band; and
transmitting beam formed signals over the secondary component carrier to the first wireless device using the signal conditions for the second wireless device.

20. The method of claim 19, further comprising:
retrieving a signal level for the first wireless device corresponding to the primary component carrier and a signal level for the second wireless device;
calculating a signal level difference between the signal level for the first wireless device and the signal level for the second wireless device; and
transmitting the beam formed signals over the secondary component carrier to the first wireless device using the signal conditions for the second wireless device when the calculated signal level difference meets a criteria.

* * * * *